3,544,612
PROCESS FOR THE PRODUCTION OF ORGANIC
ISOCYANATES
Louis Alhéritière and Marcel Repper, Melle, France, assignors to Societe Toulousaine de Produits Chimiques Tolochimie, Paris, France, a corporation of France
No Drawing. Filed Mar. 3, 1967, Ser. No. 620,295
Claims priority, application France, Nov. 29, 1966, 85,355
Int. Cl. C07c 119/04
U.S. Cl. 260—453                                     6 Claims

ABSTRACT OF THE DISCLOSURE

This application describes a continuous process for the production of organic isocyanates in an elongated reaction column in which an amine salt, preferably the hydrochloride, enters the top of the column as a dispersion in a reaction inert organic liquid, phosgene enters the bottom of the column, by-product hydrogen chloride gas is collected at the top of the column, and the organic isocyanate in the organic liquid is withdrawn from the bottom of the column. A temperature gradient of from 40° C. to 180° C. is maintained from the top to the bottom of the column. If desired a portion of the by-product hydrogen chloride can be used to prepare the amine hydrochloride. A procedure is described for washing phosgene out of the hydrogen chloride gas.

---

This invention is concerned with the preparation of organic isocyanates. More particularly it is concerned with a continuous process for the production of organic isocyanates by reaction of an acid addition salt of the corresponding amine with phosgene.

Organic isocyanates comprise a large and useful class of organic compounds including aliphatic and aromatic mono-, di- and polyisocyanates. They have known applicability to the production of a variety of commercially useful products including, for example pharmaceuticals, flexible and rigid foams, adhesives, protective coatings and elastomeric fibers. Organic diisocyanates such as 2,4- and 2,6-tolylene diisocyanate, 4,4'-diphenylmethane diisocyanate, 1,6-hexamethylene diisocyanate, 1,5-naphthalene diisocyanate, 3,3' - dimethoxy - 4,4'-biphenyl diisocyanate, 3,3'-dimethyl-4,4'-biphenyl diisocyanate, 4,4'-biphenyl diisocyanate and various isomers of phenyl diisocyanates are especially useful for the production of a wide variety of polyurethanes which are employed commercially as adhesives, protective coatings, flexible and rigid foams and elastomeric fibers.

In conventional processes for the production of organic isocyanates by reacting phosgene with an amine or an amine salt a large molar excess of phosgene is employed. As much as a 100% to 500% excess is often employed, and this necessitates the use of expensive apparatus to insure sufficient volume to handle the excess phosgene and to do so safely. Moreover, the excess, unreacted phosgene which is collected from the reaction vessel is contaminated with hydrogen chloride. It must be purified before it can be recycled, and this increases the operating costs because of the expensive purification apparatus required, and for other reasons.

It has long been a problem in the art to avoid the use of such large excesses of phosgene and to eliminate the requirement of purification. It would also be desirable to effect reaction at or close to atmospheric pressure.

It has been discovered in accordance with this invention that it is possible to continuously produce organic isocyanates at or slightly above atmospheric pressure without using more than the theoretical quantity of phosgene.

The invention accordingly comprises a process for the continuous production of organic isocyanates by reaction of phosgene with an amine acid addition salt in a reaction of inert organic liquid, preferably at a pressure of from about atmospheric to about 4 kg./cm.$^2$ effective, in an elongated, substantially vertical reaction vessel by continuously feeding the top of the reactor with the organic liquid containing the salt, while continuously feeding the lower part of the reactor with gaseous phosgene, and continuously withdrawing the gas produced in the reaction from the top part of the reactor, and at the same time withdrawing the organic liquid containing the organic isocyanate thus produced from the bottom part of the reactor. The reaction is carried out under conditions such that the temperature gradient from the top of the reactor to the bottom of the reactor is from at least 40° C. at the top to at most 180° C. at the bottom.

The reaction vessel is preferably an elongated, substantially vertical reactor which is very high compared with its other dimensions. A suitable class of reactor is a column shaped reactor in which the height to diameter ratio is from about 5:1 to 30:1, preferably from 5:1 to 10:1.

The reaction vessel can be a simple, empty tube or it can be at least partially filled with an inert packing material to increase the contact between the reactants. Contact plate columns, preferably the "deep plate column" types are also useful.

The reactor is operated either as an ordinary reactor if it is substantially filled with the liquid phase during operation, or as an absorption-reaction column if the liquid flows downward from plate to plate with each plate surmounted by a gaseous atmosphere.

The reactions for the production of the organic isocyanate take place over the entire length of the reactor. In the upper portion the amine salt reacts with phosgene to produce a carbamyl chloride which decomposes in the lower portion to form hydrogen chloride and the isocyanate derivative of the amine.

As aforesaid, the temperature gradient in the reaction column is maintained at from at least 40° C. at the top to at most 180° C. at the bottom. To insure the formation of the carbamyl chloride and its decomposition to form an isocyanate under optimum conditions, it is desirable to maintain the temperature in the upper portion of the column at about 40° C. to 100° C., and the temperature in the lower portion at about 100° C. to 180° C. In actual practice there is no sharp dividing line between the upper and lower portion of the column, but the temperature gradually increases within the defined range from the top of the column to the bottom.

The temperature increases spontaneously in the top of the column since the formation of the carbamyl chloride is exothermic. It is necessary to heat the lower portion of the column since the decomposition reaction is endothermic.

Amine hydrochloride salts are preferred acid addition salts for use in this process, but other salts, for example the carbamates can also be employed. The salt concentration calculated as an amine is preferably from 5 to 20% by weight based on the total weight of the mixture. The most desirable concentration is about 10%, i.e., 8–12%.

The process is preferably carried out at a pressure which may range from atmospheric pressure to about 5 kg./cm.$^2$, more preferably to about 4 kg./cm.$^2$, although pressures somewhat above or below this range, for example up to 10 kg./cm.$^2$, can be employed but without particular advantage.

In the lower portion of the reactor the phosgene functions as an entrainer for the hydrogen chloride which forms from decomposition of the carbamyl chloride. In so doing it favorably affects the equilibrium leading to the formation of isocyanate by decreasing the hydrogen chloride concentration. In the upper portion of the reactor the phosgene reacts with the amine salt to form the corresponding carbamyl chloride.

Since most of the phosgene which is injected in the bottom of the column reacts to form product, the hydrogen chloride which issues from the top of the column is only slightly contaminated with unreacted phosgene. The organic isocyanate is withdrawn from the lower portion of the column in admixture with the reaction inert diluent and by-products, especially high boiling by-products, which form.

There are a number of advantages to the process of this invention. It is a continuous process operable at or near atmospheric pressure. It is not necessary to employ a large excess of phosgene. It is sufficient to feed the reactor with the stoichiometric amount of phosgene calculated to react with each amine group, plus the amount of phosgene corresponding to the solubility of the phosgene in the diluent under the operating conditions.

Since excess phosgene is not necessary, the reactor may be operated with a low phosgene concentration in the reaction mixture as compared with conventional processes which are ordinarily carried out at high pressure. This is an important safety factor when operating with a lethal gas under commercial conditions. Since the hydrogen chloride which is evolved at the top of the column is substantially phosgene free, there is no necessity for the expensive equipment ordinarily employed in phosgene recovery operations.

The use of amine hydrochlorides in this invention is preferred for two reasons. On the one hand, the hydrochloride does not introduce any foreign substance into the reaction mixture since the hydrogen chloride which is liberated from the salt is also produced by the two successive reactions by which the amine is converted into isocyanate. On the other hand, the use of the amine hydrochloride makes it possible to form additional quantities of amine salt for further reaction. This is accomplished by continuously recovering the required amount of hydrogen chloride from the gas issuing from the top of the reactor and reacting this gas with fresh quantities of amine.

The following three reactions, in which R represents an organic radical, are successively carried out to form isocyanates.

(1) Amine hydrochloride formation

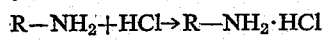
$R-NH_2+HCl \rightarrow R-NH_2 \cdot HCl$ (2) Reaction of amine hydrochloride with phosgene

$R-NH_2-HCl+COCl_2 \rightleftharpoons RNHCOCl+2HCl$ (3) Decomposition of the carbamyl chloride into isocyanate

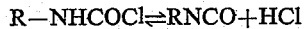
$R-NHCOCl \rightleftharpoons RNCO+HCl$

Thus for each amino group which reacts, one mole of phosgene is introduced and three moles of hydrogen chloride issues from the upper portion of the reactor. One mole of hydrogen chloride may be recovered to convert a mole of amine into a mole of amine hydrochloride. The remaining two moles of hydrogen chloride are removed from the apparatus.

For carrying out the aspect of the invention in which an amine hydrochloride is formed, an amine hydrochlorination reactor is annexed to the phosgene-amine salt reaction column or reactor. The amine hydrochlorination reactor is continuously fed with amine and diluent, and with hydrogen chloride gas from the top of the reactor. The amine and diluent may be introduced separately or in admixture in the form of a dispersion or solution. If the amine is introduced separately, it may be in a molten condition. The hydrogen chloride gas from the upper portion of the main reactor bubbles through the solution or dispersion in the hydrochlorination reactor and the amount of hydrogen chloride necessary to convert the amine into the hydrochloride salt is retained.

It is preferred to maintain the temperature of the hydrochlorination reaction at from about 40° C. to about 80° C. to avoid decomposition of the salt. The desired temperature may be maintained by heating or cooling the reactor, depending upon the amine chosen, its physical condition, i.e., molten, dissolved or dispersed, and the particular diluent.

The unreacted hydrogen chloride bubbles through the hydrochlorination apparatus and may be collected. It is substantially phosgene free. The dispersion of amine hydrochloride in diluent which forms is withdrawn from the hydrochlorination apparatus and fed to the top part of the amine salt conversion reactor, or main reactor.

The reaction inert organic liquid employed as a diluent in the main reactor in the hydrochlorination reactor may be any of those conventionally employed in the conversion of amines to isocyanates. They may be high boiling or low boiling. Organic liquids containing up to sixteen carbon atoms may be employed. Oxygenated organic liquids, especially esters or ketones are useful. Hydrocarbons and halogenated hydrocarbons may also be employed. Typical diluents include diethyl, di-isopropyl, dibutyl and di-isobutyl phthalates or isophthalates, dibutyl and di-isobutyl adipate, methyl, ethyl, butyl and isobutyl butyrates and isobutyrates, 2-ethyl-hexyl 2-ethyl hexanoate, toluene, chlorobenzene, o-dichlorobenzene and methyl isobutyl ketone, or mixtures thereof.

It has been discovered as a further aspect of this invention that the recovery of the small amounts of phosgene still contained in the hydrogen chloride gas issuing from the main reactor or from the hydrochlorination apparatus when a low boiling diluent is used, can be improved by washing the hydrogen chloride with a low boiling diluent identical with that used in the main reactor and the hydrochlorination apparatus, if the latter is utilized. Preferably the gas washing operation is carried out methodically, counter-currently, most advantageously in a gas-liquid contact column containing packing materials to increase the contact area. The packing column is continuously fed in the upper portion with a stream of inert diluent and in the lower portion with the gaseous stream leaving the main reactor or the hydrochlorination apparatus, if the latter is utilized.

Desirably, the gases leaving the reaction column or the hydrochlorination apparatus are cooled before washing. The diluent may also be cooled. Due to the cooling, at least a portion of the phosgene condenses and liquifies, and the efficiency with which it is removed from the gas stream by the cooled diluent is increased. It is thus possible to reduce the phosgene content of the hydrogen chloride finally removed from the isocyanate production plant, to a minimum value. This is an important advantage due to the high toxicity of phosgene.

The inert diluene used in the gas washing operation may thereafter be introduced to the main reactor or the hydrochlorination reactor to serve as the carrier for the amine hydrochloride disperison which is then led to the main reactor. In any event the dissolved phosgene is utilized in the formation of isocyanates. It is preferred to place the gas-washing apparatus above either the main reactor or the hydrochlorination apparatus so that the gas easily enters the gas-washing apparatus and the wash liquid may be easily refluxed to the desired point. If the washing operation is conducted in an apparatus in such a way that the diluent with phosgene dissolved therein refluxes to the main reactor or the hydrochlorination reactor the concentration of amine in the main reactor may be adjusted to the above defined values even if the amine is introduced to the reactor in the molten state.

The inert, low boiling doiluent may be selected from those defined above. Preferred diluents include methyl, ethyl, butyl or isobutyl butyrate or isobutyrate, toluene, chlorobenzene or o-dichlorobenzene, methyl isobutyl ketone, or mixtures of these diluents.

The following non-limiting examples are given by way of illustration only.

EXAMPLE I

The apparatus, which is operated at atmospheric pressure, comprises an amine hydrochlorination vessel, consisting of a glass balloon of a capacity of 1 liter, and an isocyanate production reactor consisting of a glass column fitted with bubble plates. The column is 3 meters high and has a cross-section of 8 square centimeters. The upper portion of the column, constituting the phosgene-amine salt reaction zone, comprises 14 plates and is heated by means of an external jacket. The lower portion of the column, constituting the carbamyl chloride decomposition zone, comprises 6 plates and is heated by means of an external jacket, different from the jacket which serves to heat the upper portion.

During the operation the amine hydrochlorination vessel is maintained at a temperature of 50° C., the upper portion of the column at a temperature of 50° C. at its top and 80° C. at its base, and the lower portion of the column at a temperature of 100° C. at its top and 130° C. at its base.

The amine hydrochlorination vessel is fed, per hour, with 545 ml. of a 8% (by weight) solution of tolylene diamine in diethyl isophthalate, i.e., 0.4 mole of tolylene diamine per hour. The same vessel is also continuously traversed by the hydrogen chloride gas stream issuing from the top of the column.

The column is fed at its top with the dispersion of tolylene diamine hydrochloride in diethyl isophthalate, produced in the amine hydrochlorination vessel, and at its base, with 0.8 mole/hr. of phosgene.

There is withdrawn from the foot of the column a clear isocyanate solution, which is subjected to distillation by conventional techniques to separate therefrom the tolylene di-isocyanate, the diluent and the high boiling by-products. There is so recovered, per hour, 65.07 grams of tolylene di-isocyanate and 561.2 grams of diethyl isophthalate.

The tolylene di-isocyanate yield amounts to 93.5%.

The hydrogen chloride gas which is removed after passage through the amine hydrochlorination vessel contains only 2% phosgene by volume.

EXAMPLE II

The operation is carried out in the apparatus of the Example I, but there is added thereto, above the amine hydrochlorination reactor, a gas cooling device surmounted by a small gas-washing column filled with Raschig rings.

During the operation, which is carried out under an effective pressure of about 2 kg./cm.$^2$, the amine hydrochlorination reactor is maintained at a temperature of 70° C., the upper portion of the reaction column at a temperature of 70° C. at its top and 90° C. at its base, and its lower portion at a temperature of 100° C. at its top and 130° C. at its base.

The amine hydrochlorination reactor is fed, per hour, with 407 grams of a 12% (by weight) solution of tolylene diamine in toluene, i.e., 0.4 mole per hour of tolylene diamine. This reactor is also continuously traversed by the hydrogen chloride gas stream issuing from the top of the reaction column.

The reaction column is fed at its top with the tolylene diamine hydrochloride suspension in toluene which has been produced in the amine hydrochlorination reactor and, at its base, with 0.8 mole per hour of phosgene.

The hydrogen chloride gas issuing from the amine hydrochlorination reactor contains 3% by volume of phosgene. This gas is cooled to 0° C. in the gas cooling device, then is washed in the small gas-washing column with 200 g./hr. of toluene which has been previously cooled to 0° C. and is fed to the top of the gas-washing column.

The gaseous mixture leaving the top of the gas-washing column only contains 0.5% by volume of phosgene. The phosgene-in-toluene solution leaving the base of the gas-washing column is refluxed into the amine hydrochlorination reactor. This refluxing lowers, in the amine salt dispersion to be reacted with phosgene, the amine hydrochloride concentration to a value corresponding to a feed with a starting amine solution of a strength of 8% by weight instead of 12%.

From the base of the reaction column is removed a clear solution which is subjected to distillation in accordance with conventional techniques to separate therefrom the tolylene diisocyanate, diluent and high boiling by-products. There is recovered in this way 66 g./hr. of tolylene diisocyanate and 558 g./hr. of toluene. The diisocyanate yield is 95%.

EXAMPLE III

The appartus of Example I is employed. The temperatures therein are the same as in Example I. The pressure is 2 kg./cm.$^2$, effective.

The amine hydrochlorination vessel is fed, per hour, with 465 grams of a 20% (by weight) solution of aniline in toluene, i.e., one mole of aniline per hour. The same vessel is traversed by hydrogen chloride gas from the top of the column, as in Example I. The column is fed at its top with the dispersion of aniline chloride, as in Example I, and at its base, with one mole/hr. of phosgene.

After distillation of the isocyanate solution, as in Example I, there is recovered, per hour, 115.5 g. of phenyl isocyanate and 372 g. of toluene.

The phenyl isocyanate yield amounts to 97%.

The final hydrogen chloride gas which is removed contains only about 3% of phosgene by volume.

EXAMPLE IV

The apparatus of Example I is employed. The temperatures therein are the same as in Example I and the pressure is atmospheric.

The amine hydrochlorination vessel is fed, per hour, with 660 grams of a 15% (by weight) solution of 4,4'-diamino diphenylmethane in o-dichlorobenzene, i.e., 0.5 mole of diamine per hour. The operation is carried out as described in Example I, the column being fed at its base with one mole/hr. of phosgene.

There is finally recovered, per hour, 117.5 g. of 4,4'-diphenylmethane di-isocyanate and 561 g. of o-dichlorobenzene.

The di-isocyanate yield amounts to 94%.

The final hydrogen chloride gas contains only about 2% of phosgene by volume.

EXAMPLE V

The apparatus of Example I is employed. The temperatures therein are the same as in Example I. The pressure is 1 kg./cm.$^2$, effective.

The amine hydrochlorination vessel is fed, per hour, with 510 grams of a 10% (by weight) solution of 3-chloroaniline in isobutyl isobutyrate, i.e., 0.4 mole of chloroaniline per hour. The operation is carried out as described in Example I, the column being fed at its base with 0.4 mole/hr. of phosgene.

There is finally recovered, per hour, 58.3 g. of 3-chlorophenyl isocyanate and 459 g. of isobutyl isobutyrate.

The isocyanate yield amounts to 95%.

The final hydrogen chloride gas contains only about 2.5% of phosgene by volume.

What is claimed is:

1. A continuous process for the production of an organic isocyanate selected from the group consisting of aromatic mono- and di-isocyanate and 1,6-hexamethylene diisocyanate by reaction of phosgene with a hydrochloride salt of the corresponding amine in a reaction inert organic liquid which comprises carrying out the reaction in an elongated reaction column in which the height to diameter ratio is from about 5:1 to 30:1 by continuously:

(1) feeding the upper portion of the reaction column with a dispersion of the amine salt in the organic liquid wherein the salt concentration calculated as the amine is from about 5% to 20% by weight based on the total weight of the salt and liquid, (2) feeding the lower portion of the reaction column with a substantially stoichiometric quantity of gaseous phosgene based on the amount of amine salt in the dispersion whereby the dispersion flows downwardly countercurrent to the phosgene to produce the said organic isocyanate and hydrogen chloride, (3) withdrawing said hydrogen chloride from the upper portion of the reaction column, and (4) withdrawing the organic liquid containing the organic isocyanate from the lower portion of the reaction column, while maintaining a temperature gradient in the reaction column from top to bottom of from at least 40° C. at the top to at most 180° C. at the bottom.

2. A process as in claim 1 in which the hydrogen chloride withdrawn from the top of the reactor is washed with a reaction inert organic liquid.

3. A process as in claim 1 in which reaction is effected at a pressure in the range from atmospheric pressure to about 10 kg./cm.$^2$.

4. A process as in claim 1 in which the amine hydrochloride is selected from the group consisting of tolylene diamine hydrochloride, aniline hydrochloride, 4,4'-diamino diphenylmethane hydrochloride and 3-chloroaniline hydrochloride.

5. A process as in claim 1 in which the amine hydrochloride is formed by reaction of the amine with a portion of the hydrogen chloride withdrawn from the upper portion of the reaction column by passing the hydrogen chloride through the said reaction inert organic liquid containing the amine at a temperature of from about 40° C. to 80° C.

6. A process as in claim 5 in which unreacted hydrogen chloride is washed with a reaction inert organic liquid.

References Cited

UNITED STATES PATENTS

| | | | |
|---|---|---|---|
| 2,642,449 | 6/1953 | Morningstar et al. | 260—453 |
| 2,644,007 | 6/1953 | Irwin | 260—453 |
| 2,680,127 | 6/1954 | Slocombe et al. | 260—453 |
| 2,757,183 | 7/1956 | Irwin | 260—453 |
| 2,908,703 | 10/1959 | Latourette et al. | 260—453 |

FOREIGN PATENTS 761,594   11/1956   Great Britain.

CHARLES B. PARKER, Primary Examiner

D. H. TORRENCE, Assistant Examiner

U.S. Cl. X.R.

23—283; 260—579